United States Patent Office 3,130,235
Patented Apr. 21, 1964

3,130,235
METHOD OF REMOVING TAR FROM PHENOL REACTOR CONTENTS
Gordon MacBeth, Walnut Creek, Calif., assignor to The Dow Chemical Company, Midland, Mich., a corporation of Delaware
No Drawing. Filed Nov. 10, 1960, Ser. No. 68,372
6 Claims. (Cl. 260—621)

This invention relates to a method of separating tar from the more useful components in the reaction mixture produced in the catalytic oxidation of benzoic acid to phenol.

It is known that benzoic acid can be oxidized by air or oxygen at elevated temperature and in the presence of suitable catalysts, such as copper and/or magnesium salts (see, for instance, U.S. Patent No. 2,727,926). In such processes a tar-like by-product gradually accumulates in the reactor and, unless removed, stops the process. It is also known to prevent the build-up of tar in the reactor by intermittently or continuously removing some of the reactor contents and extracting therefrom the desirable components by use of a suitable solvent, thus leaving the tar as a solid residue. In such processes, however, it has been found that recovery of the desirable components is tedious because the tar is by nature a finely divided solid or semi-solid which is difficult to separate from the liquid phase in the extraction step.

It is an object of the present invention to provide a process for separating tar from phenol reactor contents which avoids tedious direct separation of a solid tar phase and which also achieves substantially complete recovery and use of the catalyst salts, benzoic acid, phenol, and other desirable components of the reactor contents.

According to the invention, the reaction mixture formed in the reactor, or a portion thereof, is intermittently or continuously withdrawn from the reactor and contacted with a mixture of two immiscible solvents, one of which dissolves the desirable components but not the tar and the other of which contains the dissolved or suspended tar but not the desirable components. There is thus formed two immiscible liquid phases which can be easily separated without necessity for filtering. After separation of the phases, the solvents are removed, the recovered desirable components are returned to the reactor and the tar is discarded.

Suitable solvents for the desirable components of the reaction mixture include hot water and aqueous solutions of water-miscible alkanols.

Suitable solvents or dispersants for the tar, and which are immiscible with the above-named solvents, include the halogenated lower aliphatic hydrocarbons, such as carbon tetrachloride, ethylene chloride, trichloroethylene, perchloroethylene and methyl chloroform and the like, and aromatic solvents such as chlorobenzene, anisole, diphenyl ether, benzene, toluene, xylene, etc. The latter hydrocarbons are less suitable than the other solvents, however, because of their low density and greater tendency to dissolve some of the desirable components of the reaction mixture.

In referring to solvents which are "dispersants" for tar, I mean to include all such solvents in which, in the claimed process, tar is dissolved, suspended, emulsified or otherwise dispersed.

The proportions of the two immiscible solvents in the solvent mixture are not critical, though of course enough of each must be used to produce two phases in the solvent mixture. Also, there must be enough of each to dissolve or suspend substantially all of those components which it is intended to separate. It is, of course, desirable to operate with as small a volume of solvent as will do the job in order to minimize the size of the equipment required to carry out the extraction and to recover the solvents.

In addition to the above considerations it is highly desirable that the solvent containing the tar be heavier, i.e., have a higher density, than that containing the desirable components in order that any suspended tar particles that tend to settle will accumulate in the bottom of the vessel and be readily removed. Otherwise such particles will collect at the liquid interface, thus complicating the problem of making a clean separation of the two liquid phases.

A phenol reactor was operated substantially as described in U.S. Patent No. 2,727,926. When the tar content of the reaction mixture reached 5.4%, by weight, a 20 g. sample of the reaction mixture was withdrawn and intimately contacted with a mixture of 45 g. of perchloroethylene and 53 g. of aqueous methanol containing 85% methanol and 15% water, by weight. Practically all the material dissolved, forming two immiscible liquid phases. The lower phase, consisting essentially of perchloroethylene and tar, was separated and steam-distilled to recover the perchloroethylene, thus leaving a suspension of tar in water. This accounted for 92% of the tar in the sample. The methanol layer was partially distilled to recover the methanol, after which the residue was analyzed for desirable components. Comparison of this analysis with that of the original sample showed that the methanol solution in a single extraction step contained most of the desirable components. In a similar experiment where the reaction mixture was twice extracted with portions of the same solvent mixture, practically all the desirable components were recovered. The data were as follows:

| Component | Percent Recovered | |
|---|---|---|
| | 1 Extraction | 2 Extractions |
| Copper | 91 | 95 |
| Magnesium | 100 | 100 |
| Benzoic Acid | 74 | 99 |

When a second extraction stage is used to improve recovery of the desirable components it is preferable to use only the alcoholic solvent in the second stage; i.e., after separating the liquid phases in the first extraction step, the tar-solvent phase is again extracted with a second portion of the solvent used to dissolve the desirable components.

It is, of course, possible, and sometimes desirable to use three or more extraction stages in order to make more efficient use of the solvents. Alternatively, and preferably, the extraction may be carried out in a continuous counter-current manner.

When water-miscible alkanol, particularly methanol, is used as the solvent for the desirable components, it is essential that there be enough water present to slightly dilute the alcohol, thus causing a phase separation and reducing the solubility of the tar in the alcohol. For this purpose only a little water is needed, suitably about 3 to 35%, by volume, based on the amount of alcohol used. Larger amounts of water may be used, however, especially when the extraction is carried out at elevated temperatures. In fact, at temperatures above 100° C. pure water readily dissolves the desirable components and can be used as one of the solvents.

I claim:

1. In a process for making phenol by the oxidation of benzoic acid by elemental oxygen, wherein the oxidation reaction is catalyzed by a salt of at least one element selected from the group consisting of copper and magnesium, and wherein a tar-like by-product is formed, the improvement of withdrawing at least a portion of the reactor contents from the reactor in which the oxidation is conducted; contacting said portion with a mixture of two immiscible solvents, the first of which is a solvent in which the tar in said portion is readily dispersable but in which the other components of said portion are substantially insoluble, said first solvent being selected from the group consisting of the halogenated lower aliphatic hydrocarbons, chlorobenzene, anisole, diphenyl ether, benzene, toluene and xylene, and the second of which is a solvent in which the other components of said portion are readily soluble and is selected from the group consisting of hot water and aqueous solutions of water-miscible alkanols, thus to form two liquid phases; separating said phases; recovering the second said solvent from the phase comprising it and returning to the reactor those materials that had been dissolved in said second solvent.

2. A process as defined in claim 1 wherein the first solvent is a halogenated lower aliphatic hydrocarbon.

3. A process as defined in claim 2 wherein the first solvent is perchloroethylene.

4. A process as defined in claim 2 wherein the second solvent is an aqueous solution of a water-miscible alkanol.

5. A process as defined in claim 4 wherein the alkanol is methanol.

6. A process as defined in claim 4 wherein the second solvent contains about 3 to 35% by volume, of water.

References Cited in the file of this patent

UNITED STATES PATENTS

| | | |
|---|---|---|
| 2,727,926 | Kaeding et al. | Dec. 20, 1955 |
| 2,954,407 | Taplin | Sept. 27, 1960 |